US010703966B2

(12) United States Patent
Agrawal et al.

(10) Patent No.: US 10,703,966 B2
(45) Date of Patent: *Jul. 7, 2020

(54) CHROMIC LUMINESCENT COMPOSITIONS AND TEXTILES (71) Applicant: PERFORMANCE INDICATOR, LLC, Lowell, MA (US)

(72) Inventors: Satish Agrawal, Concord, MA (US); Louis Cincotta, Andover, MA (US); Edward D. Kingsley, Stow, MA (US); Nancy Lane, Needham, MA (US)

(73) Assignee: BAMBU VAULT LLC, Lowell, MA (US)

(*) Notice: Subject to any disclaimer, the term of this patent is extended or adjusted under 35 U.S.C. 154(b) by 396 days.

This patent is subject to a terminal disclaimer.

(21) Appl. No.: 15/293,371

(22) Filed: Oct. 14, 2016

(65) Prior Publication Data

US 2017/0029695 A1 Feb. 2, 2017

Related U.S. Application Data (60) Continuation of application No. 14/134,585, filed on Dec. 19, 2013, now Pat. No. 9,493,699, which is a
(Continued)

(51) Int. Cl.
*C09K 11/02* (2006.01)
*H05B 33/14* (2006.01)
(Continued)

(52) U.S. Cl.
CPC ............... *C09K 11/02* (2013.01); *B32B 3/10* (2013.01); *B32B 27/08* (2013.01); *C09K 11/06* (2013.01);
(Continued)

(58) Field of Classification Search
USPC ............................... 428/690, 411.1; 427/157
See application file for complete search history.

(56) References Cited

U.S. PATENT DOCUMENTS 4,481,422 A * 11/1984 deMarco ................... F41H 9/00
250/459.1
4,711,547 A 12/1987 Iizuka
(Continued)

OTHER PUBLICATIONS

Final Office Action, dated Dec. 24, 2014, U.S. Appl. No. 13/483,099, filed May 30, 2012, 14 pages.
Skoog, Douglas A., et al., Principles of Instrumental Analysis, Second Edition, (1980) Saunders College, Philadelphia, Electromagnetic Radiation, p. 107.
(Continued)

*Primary Examiner* — Lynda Salvatore
(74) *Attorney, Agent, or Firm* — Morgan, Lewis & Bockius LLP (57) ABSTRACT

A chromic luminescent composition and method for fabricating the composition are disclosed. The chromic luminescent composition comprises at least one or more non-luminescent materials and one or more luminescent materials. The one or more non-luminescent materials having absorption spectra that at least partially overlap with the spectrum of incident electromagnetic radiation. The one or more luminescent materials convert at least a portion of energy of incident electromagnetic radiation to a lower energy wavelength. The one or more non-luminescent materials and the one or more luminescent materials are selected such that, when subsequently exposed to incident electromagnetic radiation, color and brightness are substantially modulated through absorption and emission as a function of incident electromagnetic radiation. Also disclosed are a chromic luminescent textile and a method for fabricating the textile.

10 Claims, 3 Drawing Sheets

Related U.S. Application Data division of application No. 13/483,099, filed on May 30, 2012, now Pat. No. 9,469,807.

(60) Provisional application No. 61/637,893, filed on Apr. 25, 2012.

(51) Int. Cl.
*B32B 27/08* (2006.01)
*B32B 3/10* (2006.01)
*D06P 1/00* (2006.01)
*C09K 11/06* (2006.01)
*C09K 11/08* (2006.01)

(52) U.S. Cl.
CPC .............. *C09K 11/08* (2013.01); *D06P 1/004* (2013.01); *D06P 1/0012* (2013.01); *D06P 1/0016* (2013.01); *H05B 33/14* (2013.01); *Y10S 428/913* (2013.01); *Y10S 428/917* (2013.01); *Y10T 428/2481* (2015.01); *Y10T 428/24802* (2015.01); *Y10T 428/31504* (2015.04); *Y10T 442/20* (2015.04)

(56) References Cited

U.S. PATENT DOCUMENTS

| | | |
|---|---|---|
| 5,144,877 A | 9/1992 | Parks |
| 5,409,760 A | 4/1995 | Neitz et al. |
| 5,985,381 A | 11/1999 | Conner |
| 6,454,966 B1 | 9/2002 | Kobayashi et al. |
| 6,805,957 B1 | 10/2004 | Santos et al. |
| 8,846,184 B2 * | 9/2014 | Agrawal ................ C09K 11/06 252/301.16 |
| 9,469,807 B2 * | 10/2016 | Agrawal ................ C09K 11/06 |
| 9,493,699 B2 * | 11/2016 | Agrawal ................ C09K 11/06 |
| 2004/0220298 A1 | 11/2004 | Kozee et al. |
| 2009/0263644 A1 * | 10/2009 | Kelsey ...................... F41H 3/00 428/315.9 |
| 2013/0288022 A1 | 10/2013 | Agrawal et al. |
| 2013/0288075 A1 | 10/2013 | Agrawal et al. |
| 2014/0103258 A1 | 4/2014 | Agrawal et al. |

OTHER PUBLICATIONS

Non Final Office Action dated Apr. 10, 2014; for U.S. Appl. No. 13/483,099, filed May 30, 2012.

Notice of Allowance dated Jun. 9, 2014; U.S. Appl. No. 13/802,911, filed Mar. 14, 2013.

* cited by examiner

CHROMIC LUMINESCENT COMPOSITIONS AND TEXTILES

CROSS-REFERENCE TO RELATED APPLICATIONS

This application is a continuation of U.S. Nonprovisional patent application Ser. No. 14/134,585, filed 19 Dec. 2013, which is a division of U.S. Nonprovisional patent application Ser. No. 13/483,099, filed 30 May 2012, which claims priority to U.S. Provisional Patent Application Ser. No. 61/637,893, filed 25 Apr. 2012. These priority applications are incorporated by reference herein in their entirety.

BACKGROUND OF THE INVENTION

These teachings relate generally to chromic luminescent compositions, and more particularly, to the preparation and use of combinations of luminescent and non-luminescent materials that are capable of modulating color and brightness as a function of incident electromagnetic radiation and further can also be tailored to enable changes in color or brightness pattern frequency.

Currently, the majority of color renditions are achieved by deploying absorptive-only non-luminescent compositions. Although such absorptive-only non-luminescent compositions can achieve a wide color gamut, these compositions are static, that is, once applied they remain the same and hence cannot change color as the incident electromagnetic radiation changes. Furthermore as incident electromagnetic radiation intensity changes, such compositions also do not enable variations in brightness or additionally, the frequency of a pattern. As a result, the use of these compositions is substantially limiting.

There is, therefore, a need for utilizing combinations of non-luminescent and luminescent materials rendered as chromic luminescent compositions which are capable of modulating color and brightness as incident electromagnetic radiation intensity changes for a variety of applications. It is also desirable to provide for combinations of non-luminescent and luminescent materials rendered as chromic luminescent compositions that have the ability, where applicable, to alter the frequency of a color or brightness pattern as incident electromagnetic radiation intensity changes. Thus, there is a need for chromic luminescent compositions that employ both absorptive properties and emissive properties so as to achieve the ability to vary color and brightness and optionally, frequency.

Chromic luminescent compositions that, as a function of incident radiation, modulate color and brightness, as well as frequency of a pattern if desired, can have substantial utility in a number of different areas, such as for aesthetic purposes or commercial appeal. There is a need for compositions that enable changes in color and brightness to provide decorative and/or fashion effects that are not possible with the use of today's static compositions. Furthermore, these chromic luminescent compositions have significant use in camouflage systems.

Today's camouflage systems are sophisticated combinations of colored macro and/or micro patterns, as described in U.S. Pat. No. 6,805,957, that are developed to address disruption of shape and background matching for the purpose of concealment. These systems generally use absorptive pigments that subtract a certain fraction of incident radiation to produce a desired reflectance value rendered as a repeat pattern so as to achieve a brightness level similar to that of the selected surrounding for which concealment is warranted. Ideally, movement from a high frequency domain, such as a woodland terrain, to a low frequency domain, such as flat terrain, should be accompanied by a diminished pattern and increased brightness in order to minimize contrast with the background. However, this does not occur with the current camouflage systems since, once applied, they produce a reflectance value and pattern frequency that are static, i.e. they will not change as the environment and/or terrain changes, and are therefore unlikely to be as effective throughout the 24 hr day/night cycle, as well as where different terrains are encountered. It can be appreciated that when the environment is darker the color should become less bright to better blend in with the surroundings and conversely, for very bright surroundings, the colors should be brighter.

Furthermore, although there have been attempts at adaptive camouflage systems that utilize various triggers, such as those cited in U.S. Pat. Nos. 5,985,381 and 5,144,877, the technologies described in these patents rely on the varying absorptive properties of dyes formed via molecular rearrangements following either sunlight exposure or temperature change to affect color change, i.e. they are going from a colorless or light colored state to a darker colored state. The teachings in these patents are to provide an additive color function on top of the base static camouflage colors and as a result, do not then have the ability to modulate brightness so as to minimize contrast.

The human eye contains two types of photoreceptors, rods and cones. The rods are more numerous, some 120 million, and perceive brightness. The cones, of which there are 6 to 7 million, provide the eye's sensitivity to color. As a consequence, given the significantly larger number of receptors that detect variations in brightness, minimizing detection for any adaptive camouflage scheme should encompass the ability to vary at least brightness in addition to color. Unfortunately, today's camouflage systems are static and do not provide a mechanism to account for varying color and brightness, as well as frequency if applicable, so as to more effectively reduce contrast as local environment and/or terrain changes, and therefore are unable to provide optimum concealment.

Given the existing camouflage systems, there is a further need for these chromic luminescent compositions to be utilized in camouflage systems in order to produce a system that is not static, that changes as a function of incident electromagnetic radiation intensity resulting from the environment or terrain, that provides the ability to modulate color and brightness, and as required to additionally modulate frequency. This will result in a more efficient camouflage system over that of the current camouflage systems, based on having the ability to continuously adapt to the incident electromagnetic radiation intensity relative to the surrounding environment and/or terrain.

BRIEF SUMMARY OF THE INVENTION

The present teachings provide for a chromic luminescent composition that substantially modulates color and brightness through absorption and emission as a function of incident electromagnetic radiation. The chromic luminescent composition comprises one or more non-luminescent materials with absorption spectra that at least partially overlap with the spectrum of incident electromagnetic radiation and one or more luminescent materials that convert at least a portion of energy of incident electromagnetic radiation to a lower energy wavelength. The one or more non-luminescent materials and the one or more luminescent materials are selected such that, when subsequently exposed to incident electromagnetic radiation, color and brightness are substantially modulated through absorption and emission as a function of incident electromagnetic radiation. In some instances, the one or more non-luminescent materials and the one or more luminescent materials may be further selected such that, when subsequently exposed to incident electromagnetic radiation, frequency is substantially altered through substantially modulated color and brightness as a function of incident electromagnetic radiation. In one example, the absorption spectrum of at least one of the one or more luminescent materials may at least partially overlap with the emission spectrum of another one of the one or more luminescent materials. In another example, the absorption spectrum of at least one of the one or more non-luminescent materials may further partially overlap with the emission spectrum of at least one of the one or more luminescent materials. The one or more non-luminescent materials may comprise at least one of an organic non-fluorescent material or an inorganic non-fluorescent material. The one or more luminescent materials may comprise at least one of an organic fluorescent material or an inorganic fluorescent material. The chromic luminescent composition may further comprise at least one of one or more polymers, one or more dispersants, one or more binders, one or more thickeners, or one or more defoamers. The incident electromagnetic radiation may emanate from at least one of a natural light source or an artificial light source.

The present teachings also provide for a method for fabricating a composition. The method of the present teachings comprises incorporating one or more non-luminescent materials with absorption spectra that at least partially overlap with the spectrum of incident electromagnetic radiation and one or more luminescent materials that convert at least a portion of energy of incident electromagnetic radiation to a lower energy wavelength into the composition, the composition being a chromic luminescent composition. The one or more non-luminescent materials and the one or more luminescent materials are selected such that, when subsequently exposed to incident electromagnetic radiation, color and brightness are substantially modulated through absorption and emission as a function of incident electromagnetic radiation. In some instances, the one or more non-luminescent materials and the one or more luminescent materials may be further selected such that, when subsequently exposed to incident electromagnetic radiation, frequency is substantially altered through substantially modulated color and brightness as a function of incident electromagnetic radiation. The method of the present teachings may further comprise rendering at least one of one or more polymers, one or more dispersants, one or more binders, one or more thickeners, or one or more defoamers into the chromic luminescent composition.

The present teachings further provide for a chromic luminescent textile in which color and brightness of one or more portions of the textile are substantially modulated as a function of incident electromagnetic radiation. The chromic luminescent textile comprises a textile material and one or more chromic luminescent compositions incorporated into or onto one or more portions of the textile material. The one or more chromic luminescent compositions comprises one or more non-luminescent materials with absorption spectra that at least partially overlap with the spectrum of incident electromagnetic radiation and one or more luminescent materials that convert at least a portion of energy of incident electromagnetic radiation to a lower energy wavelength. The one or more chromic luminescent compositions are selected such that, when subsequently exposed to incident electromagnetic radiation, color and brightness of one or more portions of the chromic luminescent textile are substantially modulated through absorption and emission as a function of incident electromagnetic radiation. In some instances, the one or more chromic luminescent compositions may be further selected such that, when subsequently exposed to incident electromagnetic radiation, frequency of one or more portions of the chromic luminescent textile are substantially altered through substantially modulated color and brightness as a function of incident electromagnetic radiation. In certain constructions, one of the one or more chromic luminescent compositions may be applied to one of the one or more portions of the textile material and another one of the one or more chromic luminescent compositions may be applied to another one of the one or more portions of the textile material. In other instances, an absorption spectrum of at least one of the one or more luminescent materials may at least partially overlap with the emission spectrum of another one of the one or more luminescent materials. In another instance, the absorption spectrum of at least one of the one or more non-luminescent materials may further partially overlap with the emission spectrum of at least one of the one or more luminescent materials. The one or more non-luminescent materials may comprise at least one of an organic non-fluorescent material or an inorganic non-fluorescent material. The one or more luminescent materials may comprise at least one of an organic fluorescent material or an inorganic fluorescent material. The one or more chromic luminescent compositions may further comprise at least one of one or more polymers, one or more dispersants, one or more binders, one or more thickeners, or one or more defoamers. The incident electromagnetic radiation may emanate from at least one of a natural light source or an artificial light source.

The present teachings also provide for a method for fabricating a textile. The method of the present teachings comprises applying one or more chromic luminescent compositions onto or into one or more portions of the textile, the textile being a chromic luminescent textile. The one or more chromic luminescent compositions comprise one or more non-luminescent materials with absorption spectra that at least partially overlap with the spectrum of incident electromagnetic radiation and one or more luminescent materials that convert at least a portion of energy of incident electromagnetic radiation to a lower energy wavelength. The one or more chromic luminescent compositions are selected such that, when subsequently exposed to incident electromagnetic radiation, color and brightness of one or more portions of the chromic luminescent textile are substantially modulated through absorption and emission as a function of incident electromagnetic radiation. In some instances, the one or more chromic luminescent compositions may be further selected such that, when subsequently exposed to incident electromagnetic radiation, frequency of one or more portions of the chromic luminescent textile are substantially altered through substantially modulated color and brightness as a function of incident electromagnetic radiation. In certain constructions, one of the one or more chromic luminescent compositions may be applied to one of the one or more portions of the textile and another one of the one or more chromic luminescent compositions may be applied to another one of the one or more portions of the textile. The one or more chromic luminescent compositions may further comprise at least one of one or more polymers, one or more dispersants, one or more binders, one or more thickeners, or one or more defoamers. In applying one or more chromic luminescent compositions onto or into one or more portions of the textile, applying may be at least one of incorporating the one or more chromic luminescent compositions into or onto the one or more portions of the textile during manufacture of the textile or later depositing the one or more chromic luminescent compositions into or onto the one or more portions of the textile.

BRIEF DESCRIPTION OF THE DRAWINGS

The present teachings are illustratively shown and described in reference to the accompanying drawings, in which.

DETAILED DESCRIPTION OF THE INVENTION

The present teachings are directed to the creation and use of a chromic luminescent composition that can substantially modulate color and brightness as a function of incident electromagnetic radiation with the use of at least one or more non-luminescent materials and one or more luminescent materials. Such compositions may be used in a variety of applications for various purposes.

For a better understanding of the disclosure, the following terms are herein defined:

"Luminescence" as used herein refers to the emission of electromagnetic radiation from any substance. Luminescence occurs from electronically excited states following excitation of the ground state of the substance by an energy source.

"Frequency" as used herein is defined as the reciprocal of the mean distance between one or more shapes and/or one or more patterns of a single or multiple color used to mimic the surrounding environment and/or terrain and encompasses both configural information, i.e. sharp edges, fine details, etc., as well as global information about the shape, i.e. general orientation and proportions. The smaller the mean distance, the greater the frequency.

"Incident Electromagnetic Radiation" as used herein is defined as any light source, natural and/or artificial, radiating within the surrounding environment.

"Ambient Light" is term used herein synonymously with "Incident Electromagnetic Radiation", as defined above.

"Non-luminescent Material" as used herein is a material that absorbs incident electromagnetic radiation and does not substantially emit electromagnetic radiation subsequent to exposure to incident electromagnetic radiation.

"Luminescent Material" as used herein is a material which exhibits luminescence, as defined above. Generally speaking, a luminescent material absorbs electromagnetic radiation at a first wavelength and re-emits the radiation at a second wavelength that is longer and lower in energy than the first wavelength.

"Quantum Yield" as used herein is defined as the ratio of the photons absorbed to the photons emitted through luminescence, as defined above. Further, it is the probability of the excited state being deactivated by luminescence, as defined above, rather than by another non-radiative mechanism.

"Stokes Shift" is defined as the difference in wavelength between the electromagnetic radiation that is absorbed and emitted by a luminescent material, as defined above.

In general, the chromic luminescent composition, according to the present teachings, comprises at least one or more non-luminescent materials and one or more luminescent materials. The one or more non-luminescent materials have absorption spectra that at least partially overlap with the spectrum of ambient light and may include organic and/or inorganic non-fluorescent materials. Additionally, the absorption spectrum of at least one of the one or more non-luminescent materials may partially overlap with the emission spectrum of at least one of the one or more luminescent materials. The one or more luminescent materials convert at least a portion of the energy of ambient light to a lower energy emissive wavelength and may include organic and/or inorganic fluorescent materials. The one or more luminescent materials are arranged in such a way as to effectively ensure efficient energy transfer in order to enable substantially modulating at least color and brightness through emissive light energy in response to ambient light exposure. The ratio of luminescent material(s) to non-luminescent material(s) within the composition(s) are determined by the absorptive, reflective, and emissive characteristics as well as the concentration of each material such that the combination(s) will provide the necessary requirements in order to produce the desired change in color and brightness, and in some cases frequency if desired, to occur within a particular terrain and/or surrounding environment. The chromic luminescent composition may further include materials such as but not limited to, one or more polymers, one or more dispersants, one or more binders, one or more thickeners, one or more defoamers, or combinations thereof.

The chromic luminescent composition according to the present teachings can substantially reduce the contrast that exists between various ambient lighting conditions by way of producing a color and brightness that is substantially similar to that of the surrounding environment and/or terrain. The chromic luminescent composition utilizes the absorptive properties of the one or more non-luminescent materials together with the absorptive and emissive properties of the one or more luminescent materials to alter color and brightness, while moving between low ambient light, e.g. a shaded environment, and high ambient light, e.g. an unshaded environment. Thus, the additional incorporation of an emissive component, i.e. the one or more luminescent materials, with a non-emissive component, i.e. the one or more non-luminescent materials, into the chromic luminescent composition, makes it possible not only to impart color change, but also simultaneously increase brightness, as opposed to decrease brightness which results with the use of only non-emissive components. Furthermore, this color change and increase in brightness can additionally reduce the frequency of a pattern through the filling and/or merging of the pattern(s), etc., which in effect reduces the number of colors exhibited by the pattern and thus the contrast otherwise present when exposed to high (bright) ambient light environments.

Figure 1:
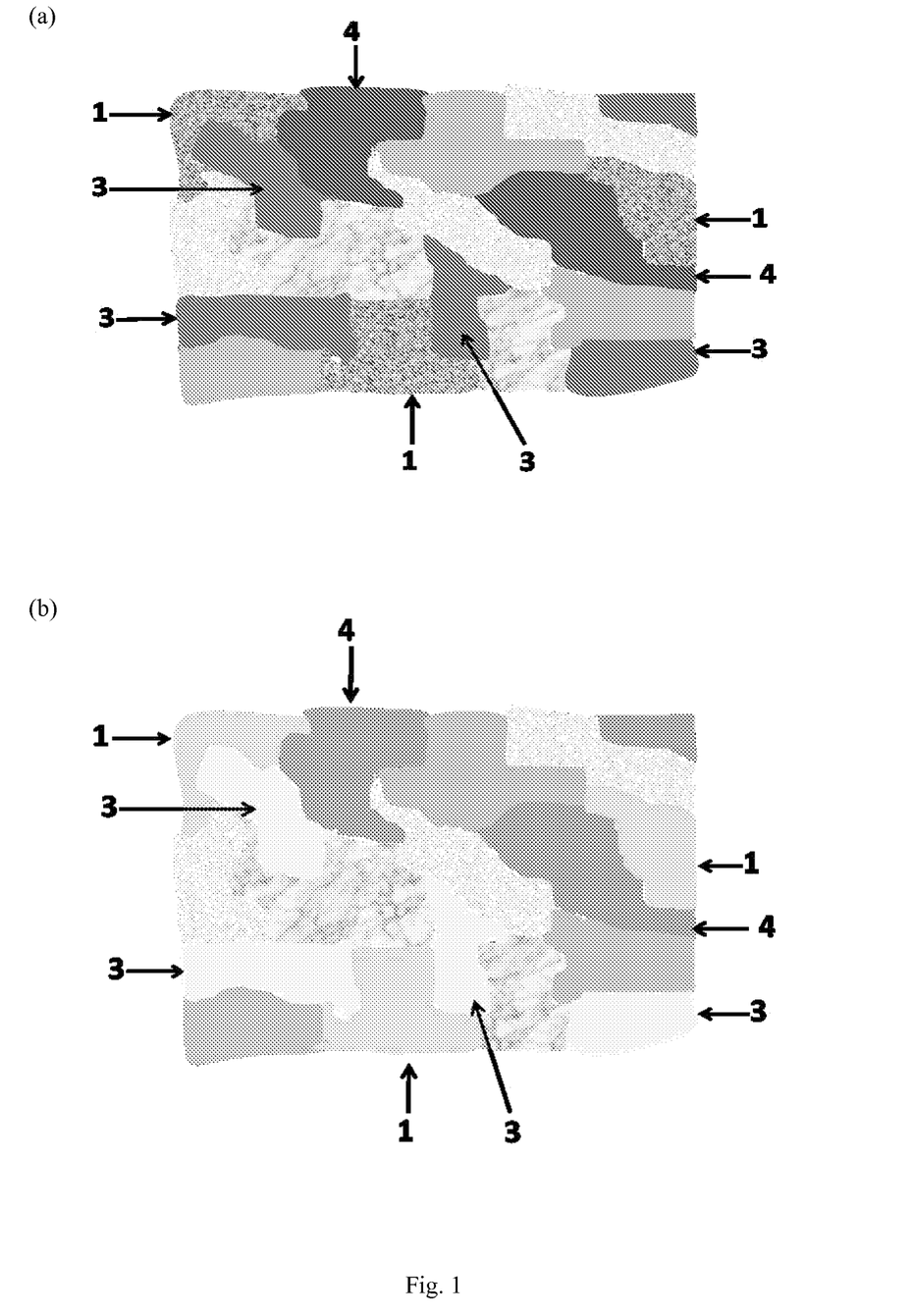
FIG. 1 illustrates a pattern with three different chromic luminescent compositions according to the present teachings, exposed to low incident electromagnetic radiation intensity (a) and high incident electromagnetic radiation intensity (b)

In one preferred embodiment of the present invention, the combination of luminescent and non-luminescent materials within the chromic luminescent composition are chosen to match one or more tactical colors of a terrain, such as but not limited to, woodland, urban, desert, or combinations thereof. These compositions enable color change and brightness increase as ambient light intensity increases. For example, a pattern containing dark tan and dark green colors in low ambient light environments can be made to change to either light tan or light green colors as a function of increasing surrounding brightness so as to reduce brightness contrast. In the instance when the pattern(s) is moved from a low ambient light surrounding to a higher ambient light surrounding, the darker colored portions of the pattern(s) will become lighter and brighter to substantially mimic that of the higher ambient light surroundings, as illustrated in FIG. 1. FIG. 1 depicts the same pattern with one preferred chromic luminescent composition according to the present teachings deposited onto or into area 1, another chromic luminescent composition deposited onto or into area 3, and another chromic luminescent composition deposited onto or into area 4 of the pattern when exposed to low ambient light (a) and when exposed to increased ambient light (b). FIG. 1 (a) and (b) both demonstrate the behavior of exemplifications of chromic luminescent compositions according to the present teachings when exposed to varying ambient light levels, i.e. the modulation of color and brightness of the pattern as a function of incident electromagnetic radiation.

In the instance where the chromic luminescent composition is exposed to subdued lighting conditions, the combination of the emission wavelength of the one or more luminescent materials, now weakly emissive, and the unabsorbed electromagnetic radiation from the one or more non-luminescent materials, that is reflected, scattered, etc., produce a defined color and brightness. However, when the composition is exposed to increased ambient lighting levels, e.g. UV and/or visible, the one or more luminescent materials absorb a greater amount of the ambient light with the concomitant increased emission of a longer wavelength of light. This increased emission of a longer wavelength of light interacts with the unabsorbed electromagnetic radiation from the one or more non-luminescent materials, that is reflected, scattered, etc., to produce an altered color and brightness via the additive combination of both the emitted wavelength and unabsorbed electromagnetic radiation. In some embodiments of the composition, at least one of the one or more non-luminescent materials will have an absorption spectrum that partially overlaps with the emission spectrum of at least one of the one or more luminescent materials to a degree that will produce a desired color.

Figure 2:
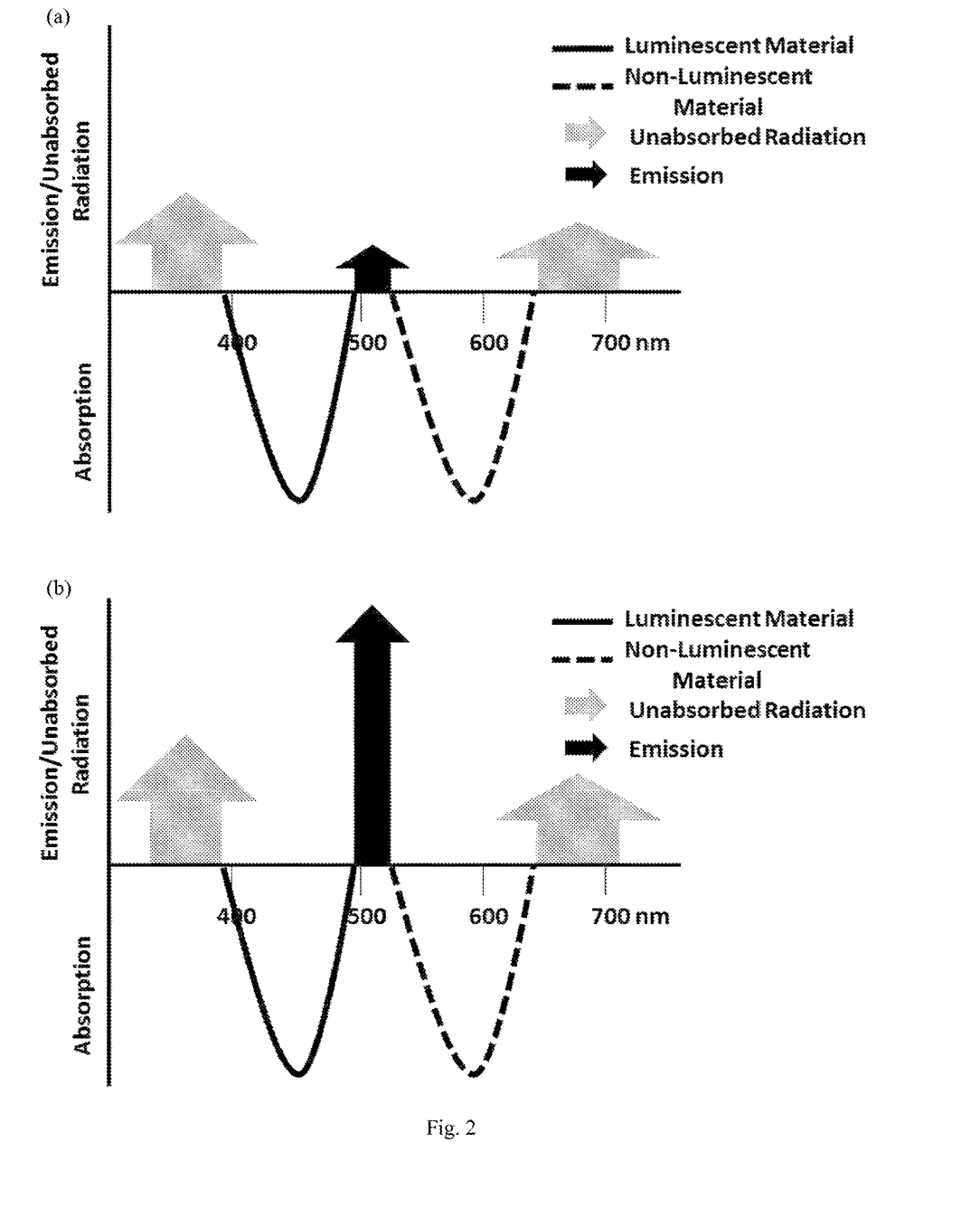
FIG. 2 is an illustrative schematic that depicts the absorption and emission behavior of one chromic luminescent composition according to the present teachings when exposed to low ambient light (a) and high ambient light (b) levels.

FIG. 2 depicts an illustration of the absorption and emission behavior of one preferred chromic luminescent composition when exposed to low ambient light (a) and high ambient light (b) levels. In this example, the chromic luminescent composition comprises one non-luminescent material and one luminescent material. Under low ambient light levels (a), the luminescent material minimally emits a lower energy wavelength, thus the defined color and brightness produced is a result of this emitted lower energy wavelength combined with the unabsorbed electromagnetic radiation from the non-luminescent material, that is reflected, scattered, etc. On the other hand, under increased ambient light levels (b), the luminescent material substantially emits a lower energy wavelength resulting in either a perceived similar color with increased brightness or a different color and brightness that encompasses both this lower energy wavelength along with the unabsorbed electromagnetic radiation from the non-luminescent material that is reflected, scattered, etc. Thus, the perceived color and brightness of the overall pattern produced under increased ambient light levels may be a either a similar color with increased brightness or a different color and brightness than that produced under low ambient light levels. In addition, this differing of color and brightness under high ambient light levels may also result in altering the frequency of the overall pattern under the same ambient light conditions by way of merging and/or filling of one or more portions of the pattern. In the instance where the chromic luminescent composition comprises more than one luminescent material, it is also possible for the luminescent moieties to engage in either energy transfer or electron transfer among each other following their absorption of light when exposed to increased ambient light levels.

Formulating colors using non-luminescent materials, i.e. conventional colorants, is well known to those in the art. For example, it is known that mixing a blue conventional colorant with a red conventional colorant will give a purple color. The most important parameters for consideration of formulating color using non-luminescent materials are their absorptive properties since they do not emit light. However, luminescent materials have the added quality of emission, and thus, this property must also be considered when calculating the combination of materials within the chromic luminescent composition according to the present teachings. Thus, different ratios of non-luminescent to luminescent materials will be utilized within each chromic luminescent composition to produce the effects necessary to yield the overall desired effect, i.e. a specific change in color and brightness, and in some instances additionally frequency. Furthermore, parameters such as but not limited to, "Quantum Yield" and "Stokes Shift" will also be important in producing an appropriate color and brightness response, as well as frequency if desired, to changing ambient lighting conditions. It should be noted that the modulation of color and brightness are brought about through altered light levels and as a result, this modulation is reversible when the original lighting conditions are re-encountered.

The chromic luminescent composition, according to the present invention may be fabricated by any method well known to those skilled in the art. The composition may take the form of inks, paints, coating fluids, or mini- or microencapsulated colorants, etc. using a wide variety of encapsulating media, such as but not limited to, silica, sol gels, ormosils, latex particles and other polymer matrices dispersed in a variety of binding agents, as well contain the constituents necessary to facilitate the fabrication of such useful inks, paints, etc. The constituents necessary may include but are not limited to, dispersants, thickeners, and defoamers. In the instance where the composition takes the form of an ink, aqueous (latex) solutions or oil based formulations may be utilized. Alternatively, the composition may be formulated in polymers using a variety of encapsulation procedures including extrusion, micro-emulsion, mini-emulsion etc., which are suitable for painting. Additionally, a variety of inorganic encapsulation techniques are also of value including sol gel, etc.

Such chromic luminescent compositions that modulate color and brightness as a function of incident electromagnetic radiation can be used in a wide range of applications, such as but not limited to, camouflage systems and aesthetic purposes. For example, such chromic luminescent compositions can be used with textiles for the fashion and cosmetic industries, as well as the decorative markets. Moreover, the ability to change the visual appearance, that is color and brightness, and, if desired, frequency, of a textile such as accent stripes or entire regions of a textile, as the environmental lighting changes, can have substantial commercial appeal. In addition, such chromic luminescent compositions can also be used with textiles to provide a camouflage system for consumer, military or industrial applications.

In accordance with the present invention, the chromic luminescent composition can be utilized to produce a chromic luminescent textile. In one preferred embodiment, the chromic luminescent textile comprises a textile material and one or more chromic luminescent compositions that are incorporated onto or into one or more portions of the textile material, in which the one or more chromic luminescent compositions are selected such that when subsequently exposed to incident electromagnetic radiation, color and brightness of the one or more portions of the chromic luminescent textile are substantially modulated. In addition, the modulation of color and brightness may also substantially alter frequency of one or more portions of the chromic luminescent textile. In one preferred embodiment, one chromic luminescent composition may be applied to one portion of the textile material and another chromic luminescent composition may be applied to another portion of the textile material. Thus, different areas of the textile material may contain different chromic luminescent compositions that change color and brightness in order to create the appropriate overall effect of the chromic luminescent textile. Furthermore, if desired, this change in color and brightness may alter the frequency of one or more portions of the chromic luminescent textile, as a result of the merging and/or filling of portions of an existing pattern of the textile.

It should be noted it is not necessary for every region of the chromic luminescent textile, according to the present teachings, to exhibit all of the variations in color and brightness. In other words, it is possible to have a certain region of the textile exhibit a specific color and brightness change as a function of incident electromagnetic radiation, while another portion of the textile remain static. Furthermore, following this specific color and brightness change, another region of the textile may undergo an alteration in frequency as a result of the specific color and brightness change. Thus, one or more regions throughout the chromic luminescent textile may behave differently and/or concurrently in order to produce the overall desired effect of the textile.

Regarding the chromic luminescent textile herein and above, the use of the one or more chromic luminescent compositions can include applying one or more chromic luminescent compositions onto or into one or more portions of the textile material using techniques currently implemented to fabricate standard textiles. These techniques include, but are not limited to, screen printing, painting, spraying, dip coating, slot coating, roller coating, bar coating, and extrusion. Such one or more chromic luminescent compositions may be incorporated into or onto one or more portions of the textile during the textile's manufacture or later deposited into or onto one or more portions of the textile.

EXEMPLIFICATIONS

The present teachings, having been generally described, will be more readily understood by reference to the following examples, which are included merely for the purposes of illustration of certain aspects and embodiments of the present teachings, and are not intended to limit the scope of these teachings.

Example 1

Preparation of a Chromic Luminescent Composition Comprising One Non-Luminescent Material and One Luminescent Material—Formulation 1

Dispersion A: A 0.2% dispersion of a yellow luminescent material, TerasilFlavin 10GFF (Huntsman, $\lambda_{max}$=450 nm; $\varepsilon_{max}$=505 nm) in a binder Permax 232 (Lubrizol), was prepared by adding 0.100 g of the luminescent material to a mortar followed by the addition of 1.00 g of a dispersant, Pluronic 10R5 (Sigma-Aldrich). This mixture was then ground with a pestle until a uniform dispersion resulted. Thereafter, 50.0 g of Permax 232 was gradually added to the mixture. The mixture was then subsequently ground until a uniform dispersion resulted. This mixture was then placed in a Branson 2200 sonicator set at a temperature of 40° C. for 15 minutes with occasional swirling by hand.

Dispersion B: A 5% dispersion of the non-luminescent material ORCOBRITE Pigment Violet 4BN concentrate (Organic Dyestuffs Corp., $\lambda_{max}$=560 nm) was prepared by adding 5.00 g of the non-luminescent material to 95 g of the Permax 232 and placing this mixture in a sonicator for 15 minutes at 40° C. with occasional swirling by hand until a uniform dispersion results.

To Dispersion A, 12.5 g of Dispersion B was added and then sonicated at 40° C. for 15 minutes until a uniform dispersion resulted to yield the chromic luminescent composition.

Example 2

Preparation of a Chromic Luminescent Composition Comprising Two Non-Luminescent Materials and One Luminescent Material—Formulation 2

Dispersion C: 9.0 g of a 0.2% dispersion of a blue non-luminescent material, Solvent Blue 38 (Sigma-Aldrich, $\lambda_{max}$=675 nm) in a binder Permax 232, was prepared by adding 0.100 g of the non-luminescent material to a mortar followed by the addition of 1.00 g of a dispersant, Pluronic 10R5. This mixture was then ground with a pestle until a uniform dispersion resulted. Thereafter, 50.0 g of Permax 232 was gradually added to the mixture. The mixture was then subsequently ground until a uniform dispersion resulted. This mixture was then placed in a Branson 2200 sonicator set at a temperature of 40° C. for 15 minutes with occasional swirling by hand.

Dispersion C was added to Formulation 1 and sonicated at 40° C. for 15 minutes until a uniform dispersion resulted to yield the chromic luminescent composition.

Example 3

Preparation of a Chromic Luminescent Composition Comprising Two Non-Luminescent Materials and Two Luminescent Materials—Formulation 3

Dispersion D: A 20% dispersion of the non-luminescent material ORCObrite Pigment Violet 4BN concentrate (Organic Dyestuffs Corp., $\lambda_{max}$=560 nm) was prepared by adding 5.00 g of the non-luminescent material to 20.0 g of the Permax 232 and then placed in a sonicator for 15 minutes at 40° C. with occasional swirling by hand until a uniform dispersion results.

Dispersion E: A 20% dispersion of the non-luminescent material ORCObrite Pigment Blue 3GN (Organic Dyestuffs Corp.) was prepared by adding 5.00 g of the non-luminescent material to 20.0 g of the Permax 232 and placed in a sonicator for 15 minutes at 40° C. with occasional swirling by hand until a uniform dispersion results.

Dispersion F: 0.175 g of yellow luminescent material, Lumogen F083 (BASF), 7.5 g of dispersant, Polysorbate 85 (Chemical Connection), 0.088 g of blue luminescent material, Eutex OB (Charkit), and 0.25 g of rheology additive, Byk 425 (BYK), were placed in a mortar and ground with a pestle until a fine dispersion was achieved. During grinding, 250 g of Lubrizol Permax 232 was added slowly. This mixture was then sonicated at 40° C. for 15 minutes with occasional swirling by hand until a uniform dispersion was achieved.

After which 0.750 g of Dispersion D and 0.5 g of Dispersion E was added to 50.0 g of Dispersion F. This mixture was then ground and sonicated for 15 minutes at 40° C. until a uniform dispersion was achieved to yield the chromic luminescent composition.

Example 4

Preparation of a Chromic Luminescent Textile That Changes Color and Brightness as a Function of Incident Electromagnetic Radiation Intensity 3.0 g of Formulation 3 as prepared in Example 3 was placed along the edge of a 4"×4" piece of NYCO textile (1:1 nylon/cotton) and drawn over the textile using a ½" stainless steel bar applying medium pressure. The textile was then placed in a 270° F. oven for 15 minutes to dry, resulting in a chromic luminescent textile that is a matte, dull green color, under low incident electromagnetic radiation intensity, and is a bright yellow green color, under increased incident electromagnetic radiation intensity.

Example 5

Figure 3:
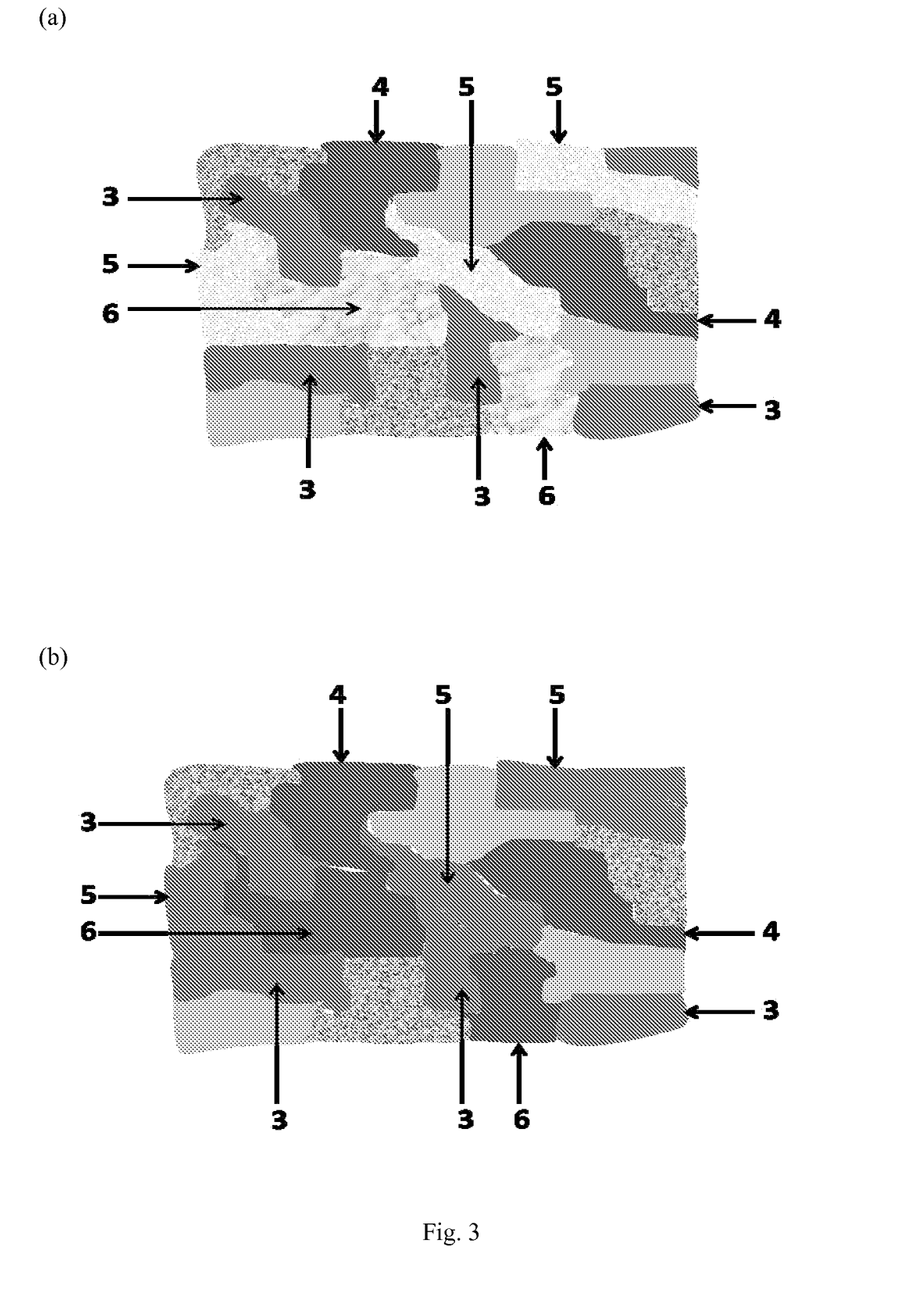
FIG. 3 illustrates one chromic luminescent textile, according to the present teachings, exposed to low incident electromagnetic radiation intensity (a) and high incident electromagnetic radiation intensity (b).

Preparation of a Chromic Luminescent Textile That Changes Color, Brightness and Frequency as a Function of Incident Electromagnetic Radiation (Characterized in FIG. 3)

The chromic luminescent textile illustrated in FIG. 3 was prepared similarly to Example 4 except that Formulation 1 as prepared in Example 1 was applied to portion labeled 5 of the textile and Formulation 2 as prepared in Example 2 was applied to portion labeled 6 of the textile. Additionally, one conventional green hue non-luminescent material was applied to portion labeled 3 of the textile and another conventional green hue non-luminescent material of a different shade was applied to portion labeled 4 of the textile. Under low incident electromagnetic radiation intensity, as shown in FIG. 3 (a), portions 5 and 6 appear as two different shades of the color tan, whereas portions 3 and 4 appear two different hues of the color green. However under increased electromagnetic radiation intensity, as shown in FIG. 3 (b), portions 5 and 6 appear as a different color and brightness, whereas the color portions 3 and 4 remain the same. In addition, this change in color and brightness of portions 5 and 6, results in the merging and/or filling of certain portions of the textile, i.e. portions 3 and 5 and portions 4 and 6, thus causing a reduction in frequency of the textile.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various embodiments, it should be realized that these teachings are also capable of a wide variety of further and other embodiments within the spirit and scope of the appended disclosure.

What is claimed is:

1. A chromic luminescent composition, said chromic luminescent composition comprising:
   one or more non-luminescent materials with absorption spectra that at least partially overlap with a spectrum of incident electromagnetic radiation; and
   one or more luminescent materials that convert at least a portion of energy of incident electromagnetic radiation to a lower energy wavelength,
   wherein said one or more luminescent materials absorb light in the visible spectrum,
   said one or more non-luminescent materials and said one or more luminescent materials being selected such that, when subsequently exposed to incident electromagnetic radiation, color and brightness are substantially modulated through absorption and emission as a function of incident electromagnetic radiation.

2. The chromic luminescent composition of claim 1, wherein said one or more non-luminescent materials and said one or more luminescent materials being further selected such that, when subsequently exposed to incident electromagnetic radiation, frequency is substantially altered through substantially modulated color and brightness as a function of incident electromagnetic radiation.

3. The chromic luminescent composition of claim 1, wherein an absorption spectrum of at least one of said one or more luminescent materials at least partially overlaps with the emission spectrum of another one of said one or more luminescent materials.

4. The chromic luminescent composition of claim 1, wherein the absorption spectrum of at least one of said one or more non-luminescent materials further partially overlaps with the emission spectrum of at least one of said one or more luminescent materials.

5. The chromic luminescent composition of claim 1, wherein said one or more non-luminescent materials comprise at least one of an organic non-fluorescent material or an inorganic non-fluorescent material.

6. The chromic luminescent composition of claim 1, wherein said one or more luminescent materials comprise at least one of an organic fluorescent material or an inorganic fluorescent material.

7. The chromic luminescent composition of claim 1, further comprising at least one of one or more polymers, one or more dispersants, one or more binders, one or more thickeners, or one or more defoamers.

8. The chromic luminescent composition of claim 1, wherein incident electromagnetic radiation emanates from at least one of a natural light source or an artificial light source.

9. The chromic luminescent composition of claim 1, wherein said incident electromagnetic radiation includes visible light.

10. The chromic luminescent composition of claim 1, wherein said chromic luminescent composition has a first color and brightness when exposed to a first intensity of incident electromagnetic radiation and a second color and brightness when exposed to a different intensity of incident electromagnetic radiation, the second color and brightness being different than the first color and brightness.

\* \* \* \* \*